(12) United States Patent
Horneman et al.

(10) Patent No.: US 7,746,917 B2
(45) Date of Patent: Jun. 29, 2010

(54) DATA TRANSMISSION METHOD AND RECEIVER

(75) Inventors: Kari Horneman, Oulu (FI); Kari Pajukoski, Oulu (FI); Esa Tiirola, Oulu (FI)

(73) Assignee: Nokia Corporation, Espoo (FI)

( * ) Notice: Subject to any disclaimer, the term of this patent is extended or adjusted under 35 U.S.C. 154(b) by 1257 days.

(21) Appl. No.: 10/915,701

(22) Filed: Aug. 11, 2004

(65) Prior Publication Data

US 2005/0276313 A1 Dec. 15, 2005

(30) Foreign Application Priority Data

Jun. 14, 2004 (FI) ................................. 20045220

(51) Int. Cl.
*H04B 1/00* (2006.01)
(52) U.S. Cl. ...................... 375/144; 375/130; 375/136; 375/137; 375/147; 375/148; 375/149; 375/219; 375/253; 375/316; 375/346; 375/348
(58) Field of Classification Search ................ 375/130, 375/136, 137, 144, 147, 148, 149, 219, 253, 375/316, 346, 348
See application file for complete search history.

(56) References Cited

U.S. PATENT DOCUMENTS

| | | | |
|---|---|---|---|
| 5,504,773 A * | 4/1996 | Padovani et al. ............ 375/130 |
| 5,805,017 A | 9/1998 | Razzell | |
| 6,002,725 A | 12/1999 | Razzell | |
| 6,205,190 B1 * | 3/2001 | Antonio et al. ............. 375/346 |
| 6,208,699 B1 * | 3/2001 | Chen et al. ................. 375/340 |
| 7,023,901 B2 * | 4/2006 | Papasakellariou ........... 375/147 |
| 2001/0007572 A1 * | 7/2001 | Odenwalder ................ 375/148 |
| 2002/0021682 A1 * | 2/2002 | Ariyoshi et al. ............. 370/335 |
| 2002/0154717 A1 * | 10/2002 | Shima et al. ................ 375/349 |
| 2003/0022636 A1 | 1/2003 | Ylitalo et al. | |
| 2003/0128746 A1 * | 7/2003 | Lerner et al. ................ 375/148 |
| 2004/0240527 A1 * | 12/2004 | Giannakis et al. ........... 375/138 |

FOREIGN PATENT DOCUMENTS

| | | |
|---|---|---|
| JP | 2001-211144 A | 8/2001 |
| RU | 1095398 A | 5/1984 |
| RU | 1246380 A1 | 7/1986 |
| RU | 1305876 A1 | 4/1987 |
| WO | WO 01/05067 A1 | 1/2001 |

OTHER PUBLICATIONS

Moshavi, Shimon; "*Multi-User Detection for DS-CDMA*", IEEE Communications Magazine, Oct. 1996, vol. 34, pp. 124-136.
Japanese Office Action, Japanese Application No. 2007-515978, Date of Issue: Aug. 14, 2009, Date of Dispatch: Aug. 24, 2009, pp. 1-3, English Translation: pp. 1-2.

* cited by examiner

*Primary Examiner*—Shuwang Liu
*Assistant Examiner*—Kabir A Timory
(74) *Attorney, Agent, or Firm*—Squire, Sanders & Dempsey, LLP

(57) ABSTRACT

A receiver of a communication system includes means for receiving repetition-coded data. The receiver also includes means for generating symbol information from the received repetition-coded data. The receiver also includes means for storing symbol information over a predetermined period and means for making tentative symbol decisions by combining the stored symbol information.

27 Claims, 2 Drawing Sheets

DATA TRANSMISSION METHOD AND RECEIVER

FIELD

Figure 1:
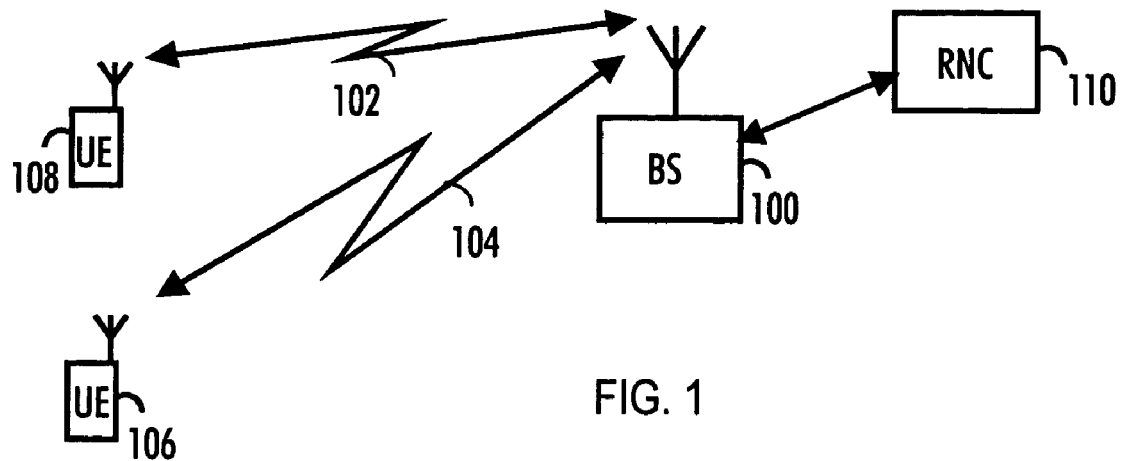

The invention relates to a data transmission method and a receiver.

BACKGROUND

As partly discussed in the authoritative book Holma, Toskala: WCDMA for UMTS, Radio Access for Third Generation Mobile Communications, John Wiley & Sons, Ltd, 2000, CDMA systems are interference-limited from both the receiver performance and system capacity points of view. The interference-limited nature of CDMA systems results from the receiver design: reception is typically based on a spreading code matched filter (MF) or a correlator. Since the received spreading codes are usually not completely orthogonal, multiple access interference (MAI) is present in the receiver.

Sub-optimal multi-user receivers have been developed for fighting multiple access interference. Multi-user receivers can be categorised in several ways: one is to classify the receivers to two main classes: linear equaliser and subtractive interference cancellation (IC) receivers. Linear equalisers, for example zero-forcing (ZF), de-correlating detectors or minimum mean square error (MMSE) detectors, are linear filters suppressing multiple access interference. The principle of an IC receiver is that the multiple access interference component is estimated, and then subtracted from the received signal for making decisions more reliable. Multiple access interference cancellation can be carried out in parallel for all users by using parallel interference cancellation (PIC) receivers, or in a serial fashion, by using serial interference cancellation (SIC) receivers.

In PIC receivers, detection is based on using tentative data decisions; de-spread bits are used to improve the performance of reception. The quality of tentative decisions is essential, because if a wrong tentative decision is made, interference in a received signal increases instead of decreasing.

The problem is that the performance of this kind of receivers is not optimal if repetition coding is used in a transmitter because the error rate of de-spread bits increases due to a lower effective coding rate (ECR).

There are prior art methods for increasing the reliability of tentative decisions. In one method, the received information block is decoded and decoded bits are used in estimating interference. The problem is that the decoding process is time-consuming and therefore causes delay.

In another solution re-transmitted data-blocks are utilised in making tentative decisions (automatic repeat request (ARQ) and hybrid automatic repeat request (HARQ)). Again, the problem is time delay: re-transmission is also a time-consuming process.

BRIEF DESCRIPTION OF THE INVENTION

According to an aspect of the invention, there is provided a data reception method for a receiver of a communication system, the method comprising: receiving repetition-coded data; generating symbol information from the received repetition-coded data; storing symbol information over a predetermined period and making tentative symbol decisions by combining the stored symbol information.

According to another aspect of the invention, there is provided a receiver of a communication system, comprising: means for receiving repetition-coded data; means for generating symbol information from the received repetition-coded data; means for storing symbol information over a predetermined period and means for making tentative symbol decisions by combining the stored symbol information.

According to another aspect of the invention, there is provided a receiver of a communication system configured to: receive repetition-coded data; generate symbol information from the received repetition-coded data; store symbol information over a predetermined period and to make tentative symbol decisions by combining the stored symbol information.

The invention provides several advantages. In an embodiment of the invention symbol information is stored over a predetermined period (over a transmission time interval, for instance) which enables gathering signal energy of also in repetition coding repeated symbols. The quality of tentative decisions is improved because a greater amount of the energy of the transmitted signal can be collected and used in the decision-making. Additionally, remarkable savings in time-delay can be achieved.

LIST OF DRAWINGS

Figure 2:
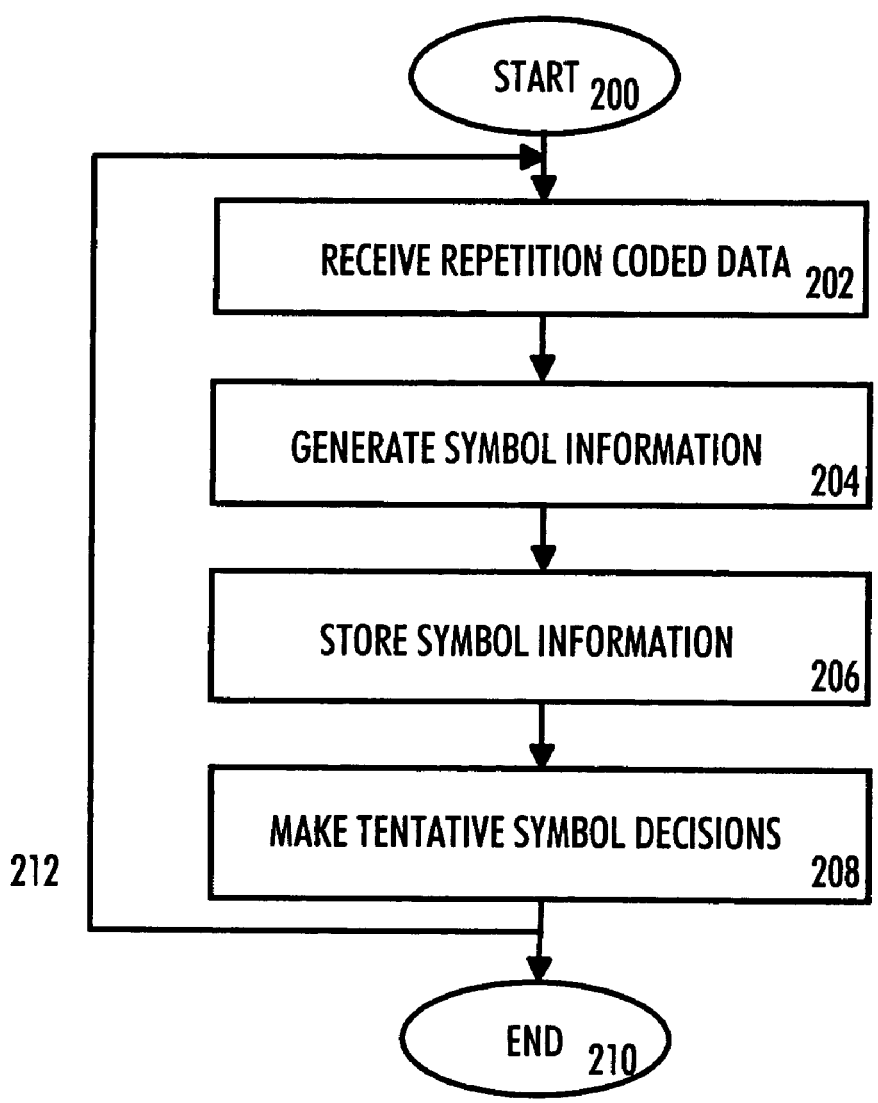
Figure 3:
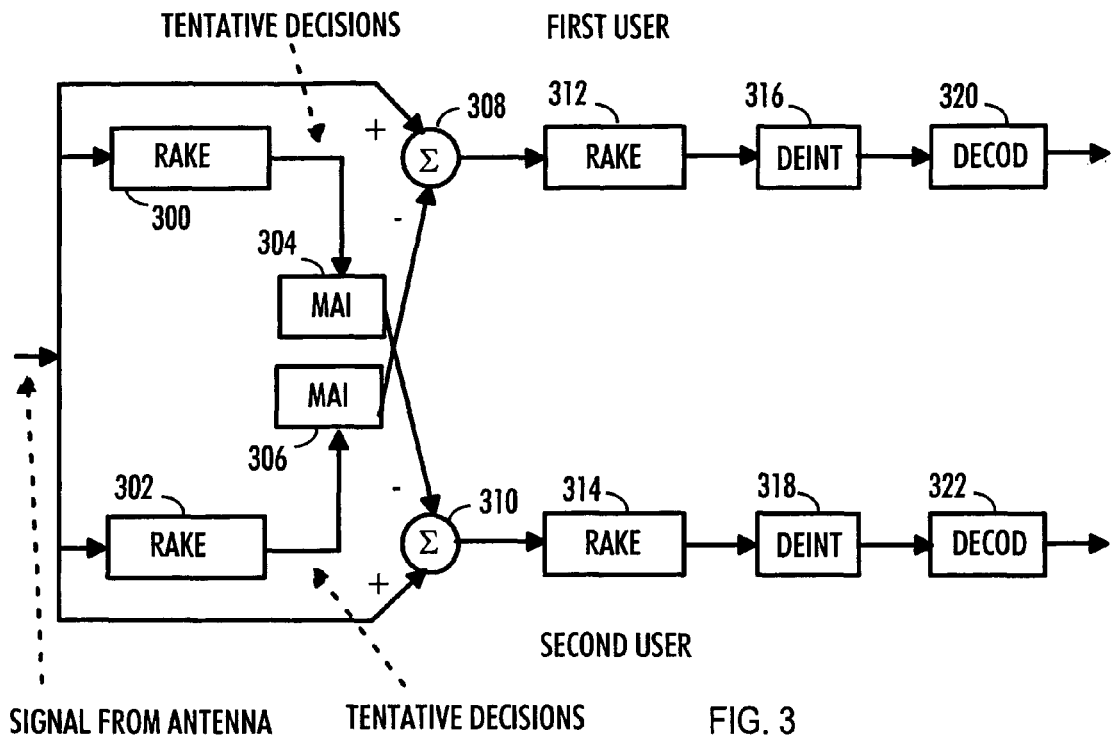
Figure 4:
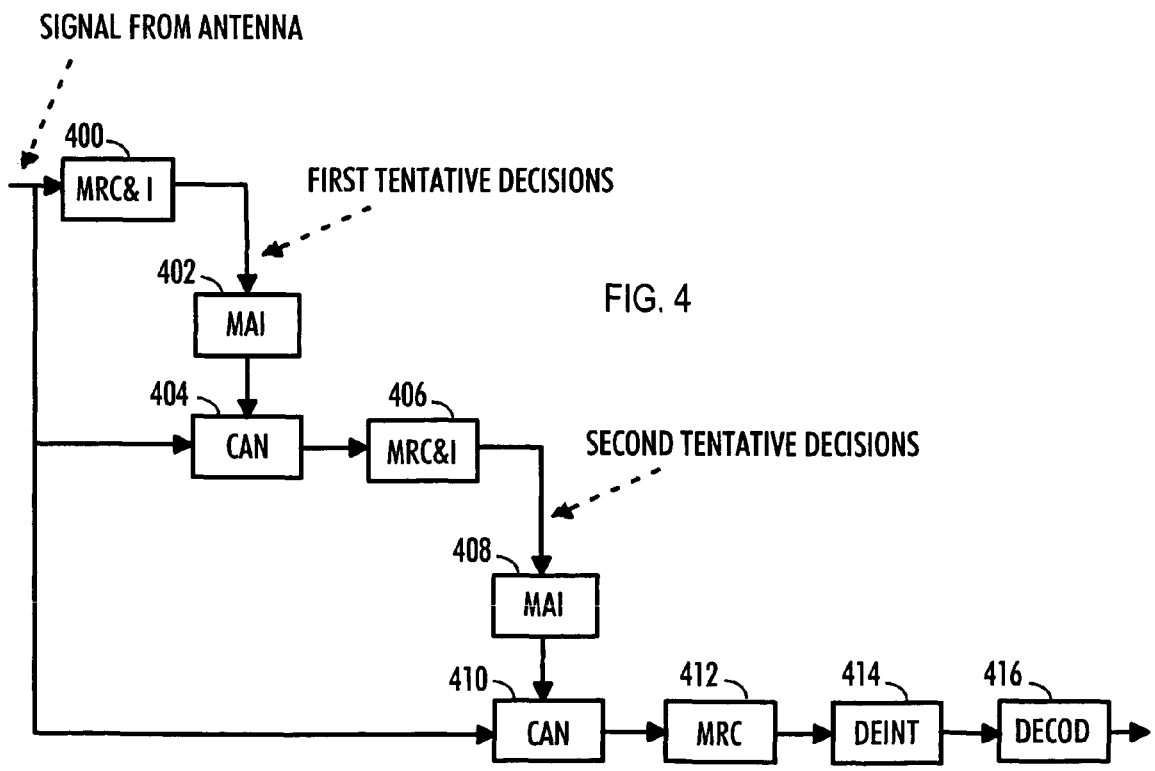

In the following, the invention will be described in greater detail with reference to the embodiments and the accompanying drawings, in which FIG. 1 shows an example of a communication system,
FIG. 2 is a flow chart,
FIG. 3 illustrates an example of a receiver, and
FIG. 4 illustrates another example of a receiver.

DESCRIPTION OF EMBODIMENTS

With reference to FIG. 1, we examine an example of a communication system to which embodiments of the invention can be applied. The present invention can be applied to various wireless communication systems. One example of such a communication system is the UMTS (Universal Mobile Telecommunications System) radio access network. It is a radio access network which includes WCDMA (wideband code division multiple access) technology and can also offer real-time circuit and packet switched services. The embodiments are not, however, restricted to the systems given as examples, but a person skilled in the art may apply the solution to other radio systems provided with the necessary properties.

It is clear to a person skilled in the art that the method according to the invention can be applied to systems utilizing different modulation methods or air interface standards.

FIG. 1 is a simplified illustration of a digital data transmission system to which the solution according to the invention is applicable. This is a part of a cellular radio system, which comprises a base station (or node B) 100, which has bi-directional radio links 102 and 104 to user terminals 106 and 108. The user terminals may be fixed, vehicle-mounted or portable. The base station includes transceivers, for instance. From the transceivers of the base station there is a connection to an antenna unit, which establishes the bi-directional radio links to a user terminal. The base station is further connected to a controller 110, a radio network controller (RNC), which transmits the connections of the terminals to other parts of the network. The radio network controller is further connected to a core network 110 (CN). Depending on the system, the counterpart on the CN side can be a mobile services switching centre (MSC), a media gateway (MGW) or a serving GPRS (general packet radio service) support node (SGSN).

The cellular radio system can also communicate with other networks, such as a public switched telephone network or the Internet.

Next an embodiment of a data reception method for a receiver of a communication system is explained in greater detail. The embodiment is especially suitable for PIC receivers but is applicable for several kinds of receiver functions, such as channel equalizing.

Next, the principle of PIC receivers is explained briefly.

In the first stage, which is typically a conventional RAKE-receiver, tentative decisions of transmitted symbols are made. A received user-specific wide-band signal is regenerated by multiplying tentative decisions and estimated channel coefficients and by re-spreading the obtained signal.

In the next stage, the re-spread wide-band signals of other users but the selected one are subtracted from the received and delayed wide-band signal. Re-detection is carried out from the residual signal by using a conventional RAKE-receiver.

It is also possible to diminish the influence of wrong decisions by weighting tentative decisions based on their reliability: the less reliable the decision, the smaller the weight.

In UTRAN the data generated at higher layers is carried over the radio interface using transport channels mapped onto different physical channels. The physical layer can support variable bit rate transport channels to offer bandwidth-on-demand services, and to be able to multiplex several services to same radio resource control (RRC) connection.

The output data stream from the coding and multiplexing unit is called a coded composite transport channel (CCTrCH). The CCTrCH is carried by one physical control channel and one or more physical data channels. In general, there can be more than one CCTrCH, but only one physical control channel is transmitted on a connection. For each transport channel, in any transmission time interval (TTI) the physical layer receives from the upper layers a set of transport blocks and the corresponding transport format indicator (TFI).

The layer 1 combines the TFI information received from different transport channels into the transport format combination indicator (TFCI). The TFCI is transmitted on the physical control channel to inform the receiver on which transport channels are active in the current radio frame. By means of the TFI information also the applied attributes, such as coding, modulation and quality of service-parameters, can be found out.

In the embodiment, tentative symbol decisions are utilized for estimating the transmitted signal. In the embodiment, signal power of repeated symbols is also gathered and used in detection in which case also noise becomes averaged. Signals can be repeated in repetition coding, for example.

The embodiment starts in block 200. In block, 202 repetition-coded data is received.

Repetition coding is used, for instance, in rate matching in addition to puncturing. In the following, an example of prior art rate matching performed in a transmitter is explained in further detail.

Rate matching is used for matching the number of bits to be transmitted to the number of bits available in a single frame on a dedicated physical channel (DPCH). This is achieved either by puncturing or by repetition. The amount of repetition/puncturing for each service depends on the service combination and the quality of service (QoS) requirements. In the uplink direction, repetition is usually preferred. Puncturing is typically used to avoid multi-code transmission or when facing the limitations of user terminal transmitters or base station receivers.

The uplink rate matching is a dynamic operation that may vary on a frame-by-frame basis. For example, if one of two transport channels has zero-rate for a moment, the rate matching increases the symbol rate of other service to the amount that all uplink channel symbols are used (assuming that the spreading factor would remain the same).

The rate matching takes into account the number of bits of active traffic channels in the frame in question. The admission control in the RNC provides a rate-matching attribute to control the relative rate matching between different traffic channels. The rate-matching attribute is used to calculate rate matching values when multiplexing several traffic channels for the same frame.

By means of the rate-matching attribute and the transport format combination indicator (TCFI) the receiver can calculate the rate matching parameters used and perform an inverse operation. By adjusting the rate-matching attribute, the admission control of the RNC can adapt the quality of different services so as to reach an equal or a near equal symbol power level requirement for all services.

In block 204, symbol information is generated from the received rate matched data, typically by symbol level detection using a RAKE-receiver. In some cases it is also possible to use an MMSE type of receiver.

In block 206, symbol information over a predetermined period is stored. The symbol information is typically stored in a buffer. In block 204 the detected symbols are mainly stored for de-repetition coding to find out which symbols are copies of each other (repeated) and can therefore be combined together. The repeated symbols do not necessarily form an uninterrupted sequence but they may be located at a distance from one another. The predetermined buffering period may be a transmission frame or a transmission time interval (TTI), for example.

After the entire repetition-coded block has been received, some reception functions are typically carried out, such as second de-interleaving, transport channels de-multiplexing and de-rate matching.

In UTRAN transmission, second interleaving performs radio frame interleaving, sometimes called intra-frame interleaving. From the output of the second interleaver the bits are mapped on the physical channels.

In 3GPP, standard rate matching is carried out separately for each transport channel and second interleaving is carried out after transport channel multiplexing and rate matching. Therefore, if the 3GPP standard is used, de-interleaving, transport channel de-multiplexing and de-rate matching are typically performed in a receiver after symbol information buffering for finding out the locations of repeated symbols. These functions can be performed by using the same receiver blocks than those used in the decoding process.

It is possible, that also in some other systems than in 3GPP, it is preferable to carry out at least on of the operations, second de-interleaving, transport channel de-multiplexing and de-rate matching, after storing the symbol information, for finding out the locations of repeated symbols.

In block 208, tentative symbol decisions are made by combining the stored symbol information. There may be one or more replicas of a single symbol. Because symbol information is stored over a predetermined period (typically a transmission time interval or a transmission frame), the signal power of repeated symbols is also combined and used in the decision-making. In other words, the repeated symbols are combined in order to maximise the signal-to-noise ratio. This improves the quality of tentative decisions. The tentative symbol decisions are utilized for estimating the transmitted data.

In one embodiment, tentative symbol decisions are made for each user by using a RAKE bank. Channel estimation is typically also carried out at the RAKE stage. The decision device for the tentative decisions may be soft or hard decision device. The decision device may be based, for instance, on using sign functions for hard decisions and a hyperbolic tangent function for soft decisions. Thus the reliability of the decisions is taken into account.

There are also weighting methods, such as zero-zone and linear weighting. In zero-zone weighting the decision is zero, instead of −1 or +1, when decision variables are small. In linear weighting decisions follow decision variables linearly when decision variables are small and when they are −1 or +1, a the decision is thought to be reliable.

The embodiment ends in block 210. Arrow 212 depicts one possibility for repeating the embodiment.

In FIG. 3, there is illustrated one embodiment of a PIC receiver according to the data transmission method described above. It is obvious for a person skilled in the art that the structure of the receiver may vary to some extent according to implementation. For instance, the number of users (number of RAKE branches) may vary. The embodiment is depicted for two users only for the sake of clarity. The structure of several RAKE receivers is also called a RAKE bank.

Block 300 includes a RAKE receiver of a first user. RAKE receiver block 300 typically includes code generators and a correlator for de-spreading and integrating user data. RAKE receiver block 300 typically also includes a channel estimator and a channel compensator. The channel estimator estimates based on pilot symbols the channel state performing a channel estimate. The channel compensator compensates channel effects by multiplying a symbol by a complex-conjugate of the channel estimate. The RAKE combiner sums the channel-compensated symbols, thereby providing multi-path diversity against fading. The RAKE receiver usually includes a matched filter for determining and updating the current multi-path delay profile of the channel.

The RAKE receiver block according to the embodiment of the invention also includes means for making tentative symbol decisions according to the embodiment illustrated in FIG. 2. Therefore the RAKE receiver block 300 also includes a memory element and means for generating symbol information, for instance. In this example, channel estimation is carried out at the RAKE stage.

The RAKE receiver block 302 is for a second user.

The tentative symbol decisions are taken into multiple access interference (MAI) estimation blocks 304, 306 with the channel estimates. MAI estimators 304, 306 compute an estimate of a received wide-band signal (i.e. tentative symbol decisions multiplied by channel estimates, then re-spread and summed). The MAI estimates are conveyed to summing elements 308, 310 in such a way that the MAI estimates made from the first user's signal are subtracted from the received signal to obtain a more reliable signal for the second RAKE stage of the second user. The MAI estimates made from the second user's signal are subtracted from the received signal to obtain a more reliable signal for the second RAKE stage of the first user.

In practice, a residual structure where only one wideband signal has to be conveyed to the second stage is used instead of the principled structure explained above, where user-specific wideband signals are conveyed to the second stage. The residual structure thus uses bus resources more economically.

The second RAKE stage blocks 312, 314 typically includes code generators and a correlator for de-spreading and integrating user data. In practice, the RAKE receiver of the second stage does not usually include channel estimation or impulse response measuring operations. The RAKE combiner sums the channel-compensated symbols, thereby providing multi-path diversity against fading. The RAKE receiver usually includes a matched filter for determining and updating the current multi-path delay profile of the channel.

There are de-interleaving blocks 316, 318 and decoding blocks 320, 322 after which final bit decisions are obtained on both user signals, from which interference has been removed. It is also possible to use a multi-stage interference cancellation receiver. One example of such a receiver is seen in FIG. 4. It is obvious for a person skilled in the art that the structure of the receiver may vary to some extent according to implementation. For instance, the number of stages may vary.

A received signal is conveyed to first maximum ratio combining (MRC) and symbol information block 400, where channel effects are compensated. The symbols obtained after channel compensation can be summed to recover the energy across delay positions.

MRC block 400 according to the embodiment of the invention also includes means for making first tentative symbol decisions according to the embodiment illustrate in FIG. 2. Therefore the MRC block 400 also includes, for instance, a memory element and means for generating symbol information. In this example, the channel estimation is carried out at the MRC stage.

The first tentative symbol decisions are taken into first multiple access interference (MAI) estimation block 402 with the channel estimates. MAI estimator 402 computes an estimate of a received wideband signal (i.e. tentative symbol decisions multiplied by channel estimates, then re-spread and summed). The MAI estimates are conveyed to first interference cancellation block 404.

First interference cancellation block 404 is followed by second MRC estimation and symbol information block 406, second MAI estimation block 408 and second interference cancellation block 410, whereto the received signal is also conveyed. The second tentative symbol decisions are taken to second MAI (multiple access interference) estimation block 408 with the channel estimates. The MAI estimates are conveyed to second interference cancellation block 410. After the second stage, there is in this example third MRC stage 412 (without symbol information generation means), de-interleaving block 414, and decoding block 416, after which final bit decisions are obtained from which interference have been removed.

The disclosed functionalities of the embodiments of the invention can be advantageously implemented by means of software. Other implementation solutions are also possible, such as different hardware implementations, e.g. a circuit built of separate logics components or one or more client-specific integrated circuits (Application-Specific Integrated Circuit, ASIC). A hybrid of these implementations is also feasible.

Even though the invention is described above with reference to an example according to the accompanying drawings, it is clear that the invention is not restricted thereto but it can be modified in several ways within the scope of the appended claims.

The invention claimed is:

1. A method, comprising:
  receiving repetition-coded data;
  generating symbol information from the repetition-coded data;
  storing the symbol information over a predetermined period;
  making tentative symbol decisions by combining the stored symbol information of repeated symbols with a signal power of the repeated symbols;

generating, in an interference cancellation receiver, an estimate of an interfering signal by multiplying the tentative symbol decisions with channel estimates;
making further tentative symbol decisions by combining the stored symbol information of the repeated symbols with the signal power of the repeated symbols and the generated estimate of the interfering signal; and
generating, in another interference cancellation receiver, a further estimate of the interfering signal by multiplying the further tentative symbol decision with the channel estimates.

2. The method of claim 1, wherein the storing comprises storing the symbol information over a transmission frame.

3. The method of claim 1, wherein the storing comprises storing the symbol information over a transmission time interval.

4. The method of claim 1, wherein the receiving repetition coded data comprises receiving rate-matched data.

5. The method of claim 1, further comprising: carrying out at least one of de-interleaving, transport channel de-multiplexing and de-rate matching after storing the symbol information, for finding out locations of repeated symbols.

6. The method of claim 1, wherein the generating the symbol information comprises symbol level detection using a rake-receiver.

7. The method of claim 1, wherein the making tentative symbol decisions comprises making soft decisions or hard decisions.

8. The method of claim 1, further comprising: combining repeated symbols for maximizing a signal-to-noise ratio.

9. The method of claim 1, wherein the generating the estimate further comprises re-spreading the tentative symbol decisions after they are multiplied by the channel estimates, and summing the re-spread tentative symbol decisions.

10. An apparatus, comprising:
receiving means for receiving repetition-coded data;
generating means for generating symbol information from the repetition-coded data;
storing means for storing the symbol information over a predetermined period;
deciding means for making tentative symbol decisions by combining the stored symbol information of repeated symbols with a signal power of the repeated symbols;
generating means for generating an estimate of an interfering signal by multiplying the tentative symbol decisions with channel estimates;
deciding means for making further tentative symbol decisions by combining the stored symbol information of the repeated symbols with the signal power of the repeated symbols and the generated estimate of the interfering signal; and
generating means for generating a further estimate of the interfering signal by multiplying the further tentative symbol decision with the channel estimates.

11. The apparatus of claim 10, further comprising: locating means for carrying out at least one of de-interleaving, transport channel de-multiplexing and de-rate matching after storing the symbol information, for finding out locations of repeated symbols.

12. The apparatus of claim 10, further comprising:
combining means for combining repeated symbols for maximizing a signal-to-noise ratio.

13. The apparatus of claim 10, wherein the generating means for generating the estimate is further for re-spreading the tentative symbol decisions after they are multiplied by the channel estimates, and summing the re-spread tentative symbol decisions.

14. An apparatus configured to:
receive repetition-coded data;
generate symbol information from the repetition-coded data;
store the symbol information over a predetermined period;
make tentative symbol decisions by combining the stored symbol information of repeated symbols with a signal power of the repeated symbols;
generate an estimate of an interfering signal by multiplying the tentative symbol decisions with channel estimates;
make further tentative symbol decisions by combining the stored symbol information of the repeated symbols with the signal power of the repeated symbols and the generated estimate of the interfering signal; and
generate, in another interference cancellation receiver, a further estimate of the interfering signal by multiplying the further tentative symbol decision with the channel estimates.

15. The apparatus of claim 14 further configured to:
re-spread the tentative symbol decisions after they are multiplied by the channel estimates; and
sum the re-spread tentative symbol decisions.

16. An apparatus, comprising:
a receiver configured to receive repetition-coded data;
a generator configured to generate symbol information from the repetition-coded data;
a memory element configured to store the symbol information over a predetermined period; and
a decision device configured to make tentative symbol decisions by combining the stored symbol information of repeated symbols with a signal power of the repeated symbols,
wherein the generator is further configured to generate an estimate of an interfering signal by multiplying the tentative symbol decisions with channel estimates,
wherein the decision device is further configured to make further tentative symbol decisions by combining the stored symbol information of the repeated symbols with the signal power of the repeated symbols and the generated estimate of the interfering signal, and
wherein the generator is further configured to generate a further estimate of the interfering signal by multiplying the further tentative symbol decision with the channel estimates.

17. The apparatus of claim 16, wherein the memory element is further configured to store the symbol information over a transmission frame.

18. The apparatus of claim 16, wherein the memory element is further configured to store the symbol information over a transmission time interval.

19. The apparatus of claim 16, wherein the receiver is further configured to receive repetition coded data comprising rate-matched data.

20. The apparatus of claim 16, further comprising: a positioning unit configured to carry out at least one of de-interleaving, transport channel de-multiplexing and de-rate matching after storing the symbol information, for finding out locations of repeated symbols.

21. The apparatus of claim 16, wherein the generator is further configured to generate the symbol information by symbol level detection using a rake-receiver.

22. The apparatus of claim 16, wherein the decision device is further configured to make tentative symbol decision comprising soft decisions or hard decisions.

23. The apparatus of claim 16, further comprising:
a combination unit configured to combine repeated symbols for maximizing a signal-to-noise ratio.

24. The apparatus of claim 16, wherein the generator is further configured to re-spread the tentative symbol decisions after they are multiplied by the channel estimates, and sum the re-spread tentative symbol decisions.

25. A computer program product embodied on a computer readable medium, the computer program product being configured to control a processor to perform a process, the process comprising:

receiving repetition-coded data;

generating symbol information from the repetition-coded data;

storing the symbol information over a predetermined period;

making tentative symbol decisions by combining the stored symbol information of repeated symbols with a signal power of the repeated symbols;

generating an estimate of an interfering signal by multiplying the tentative symbol decisions with channel estimates;

making further tentative symbol decisions by combining the stored symbol information of the repeated symbols with the signal power of the repeated symbols and the generated estimate of the interfering signal; and generating, in another interference cancellation receiver, a further estimate of the interfering signal by multiplying the further tentative symbol decision with the channel estimates.

26. The computer program product of claim 25, wherein the process further comprises carrying out at least one of de-interleaving, transport channel de-multiplexing and de-rate matching after storing the symbol information, for finding out locations of repeated symbols.

27. The computer program product of claim 25, wherein the generating the estimate further comprises re-spreading the tentative symbol decisions after they are multiplied by the channel estimates, and summing the re-spread tentative symbol decisions.

* * * * *